(12) United States Patent
Marocchini

(10) Patent No.: US 6,814,098 B1
(45) Date of Patent: Nov. 9, 2004

(54) ZERO CLEARANCE C-RING ASSEMBLY

(75) Inventor: Francis Marocchini, Somers, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/603,928

(22) Filed: Jun. 25, 2003

(51) Int. Cl.[7] ................................. F16K 27/12
(52) U.S. Cl. .............................. 137/315.09; 29/525.02; 137/315.27; 137/625.66; 403/326
(58) Field of Search ........................ 137/315.09, 315.27, 137/625.66; 29/525.02; 403/326

(56) References Cited

U.S. PATENT DOCUMENTS 4,405,251 A * 9/1983 Kolchinsky et al. ........ 403/326

* cited by examiner

Primary Examiner—Gerald A. Michalsky
(74) Attorney, Agent, or Firm—Carlson, Gaskey & Olds

(57) ABSTRACT

A support structure for a C-ring includes a pair of circumferentially spaced holding members on catch plates. The holding members may be moved individually into the C-ring after the C-ring is mounted within an outer housing. The two holding members thus provide support to an inner periphery of the C-ring. A locking plate has support structure moved between circumferential ends of the housing members, thus providing effective support for the C-ring around its entire inner periphery. In this way, the two parts secured by the C-ring need not be moved relative to each other to insert the C-ring. The clearance or ability to move one of the two parts relative to the other which has been required in the past to mount a C-ring, is not necessary. This makes the inventive C-ring particularly useful for new applications, such as holding a porting sleeve within a valve housing.

13 Claims, 2 Drawing Sheets

ZERO CLEARANCE C-RING ASSEMBLY

This invention was made with Government support under contract N00019-02-C3003 awarded by the United States Navy. The Government has certain rights in this invention.

BACKGROUND OF THE INVENTION

This application relates to a unique holding assembly using a C-ring without the requirement of any clearance axially inward for the C-ring.

C-rings are often used to hold loaded assemblies in a fixed location. C-rings are desirable because they are an efficient mechanism to retain highly loaded assemblies using a minimal support structure (radially and axially) relative to conventional closures (i.e., threaded caps). In general, a C-ring is a spring biased, ring shaped device that has two ends opposed to each other at a defined distance to allow for compression during assembly. In conventional assemblies, the mechanism being retained is axially compressed beyond its intended position to allow the C-ring to be installed. Thus, axial clearance is required.

The requirement of axial clearance has limited the use for C-rings. In particular, there are many combinations where it would be desirable to use C-rings, however the assemblies being retained cannot accommodate the axial clearance required to install the C-ring and therefore the C-ring has not been able to be used.

The present invention provides a C-ring assembly that overcomes this shortcoming and allows the use of the C-ring and all its benefits to be used.

SUMMARY OF THE INVENTION

The present invention discloses a C-ring assembly. In particular, the C-ring is initially installed into the groove, and then catch plates or holding members are slid under the C-ring. The holding members provide the support to retain the assembly.

In a most preferred embodiment, the holding members include at least two holding members that together provide support over a portion of the circumference of the C-ring. Due to the small circumferential extent of the two holding members, each may be easily moved into the opening of the C-ring and then snapped into place. In a most preferred embodiment, a locking plate is then moved between the two holding members. The locking plate further supports the catch plates that complete the circumferential support for the C-ring.

In this way, no clearance is required. Instead, the C-ring is moved into place, and the holding members and locking plate are then assembled within the C-ring. The present invention thus allows the use of a C-ring without the requirement of clearance.

A most preferred application of this C-ring assembly is utilized in a spool valve to hold the porting sleeve relative to the housing at a desired location.

These and other features of the present invention can be best understood from the following specification and drawings, the following of which is a brief description.

DETAILED DESCRIPTION OF THE DRAWINGS

Figure 1A:
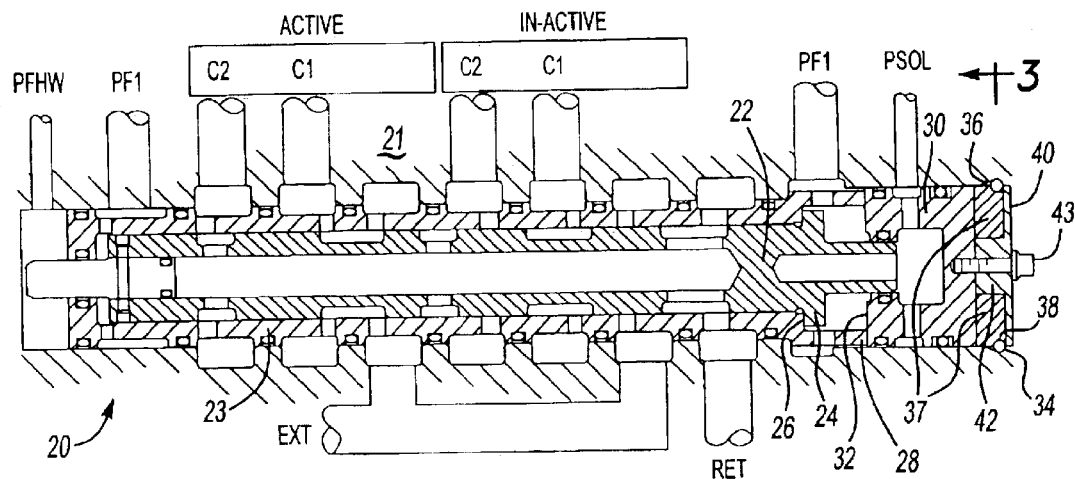
FIG. 1A is a cross-sectional view through an example spool valve incorporating the present invention.

A spool valve 20 is illustrated in FIG. 1A received within an outer housing 21. A piston 22 is movable within a porting sleeve 23. As is known, a number of inlet and outlet ports communicate with openings within the porting sleeve, and further with various openings within piston 22 and housing 21. Such ports and openings would vary with the application of spool valve 20, and those illustrated are merely exemplary. A boss 24 is formed at a forward end of piston 22 and abuts an inner surface 26 of the porting sleeve 23. A forward end 28 of the sleeve 23 abuts a closure plate 30 at face 32. A C-ring 34 is received in a groove 36 in the housing 21 and further in a groove 38. A locking plate 40 incorporates support structure 42 positioned between two circumferentially spaced catch plates or holding members 37. Pins or bolts 43 fix the locking plate 40 to the closure 30.

Figure 1B:
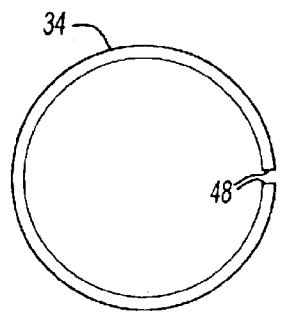
FIG. 1B shows the basic structure of a C-ring.

FIG. 1B shows C-ring 34 having spaced ends 48.

Figure 2:
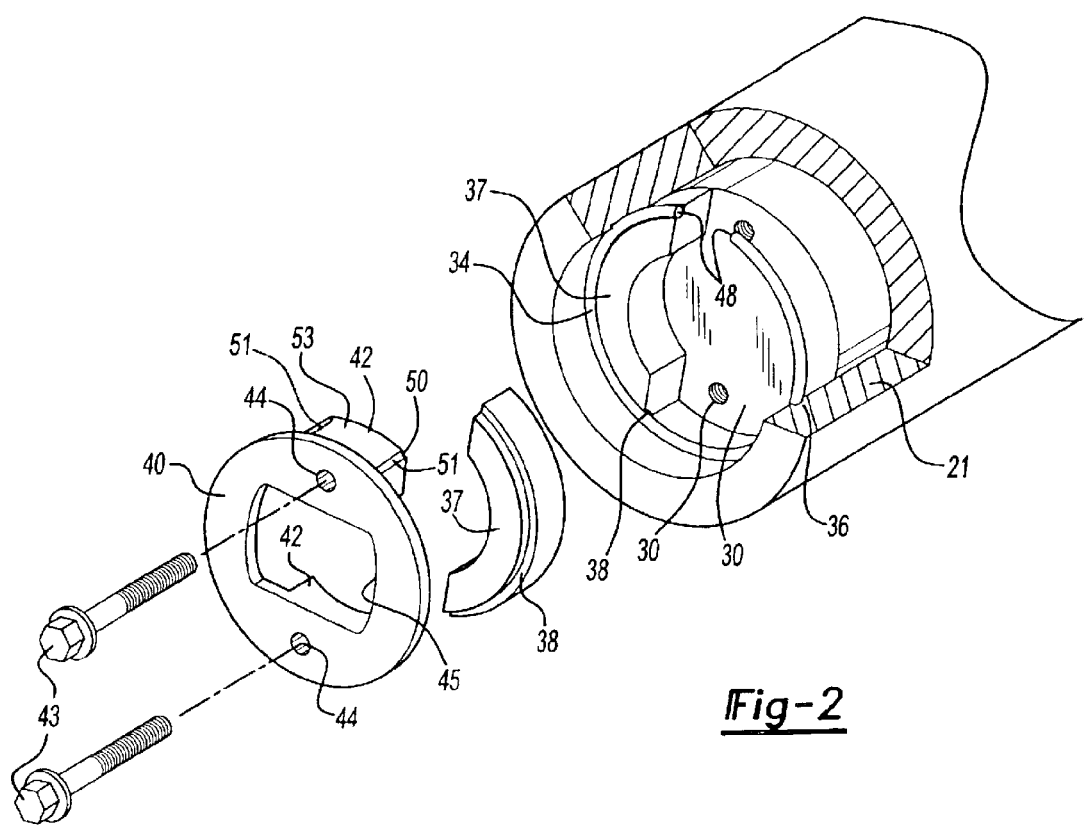
FIG. 2 is an exploded view of the inventive C-ring assembly.

As shown in FIG. 2, the outer housing 21 receives closure plate 30 and the C-ring 34. The holding members 37 each have generally circular outer and inner peripheral surfaces, but each of which extend less than 180° about a center axis. Holding members 37 have groove portions 38 at an outer periphery. Groove portions 38 are preferably curved to provide support over the entire surface of the C-ring.

As can be appreciated, an upper support structure 42 includes grooves 51. The ends 48 of the C-ring move into those grooves 51. A ledge 53 intermediate the grooves 51 extends between the ends 48 of the C-ring when assembled. As can be appreciated from FIG. 3, an opposed structure 42 may have a groove 55 across its circumference such that the C-ring 34 can sit in the groove.

Figure 3:
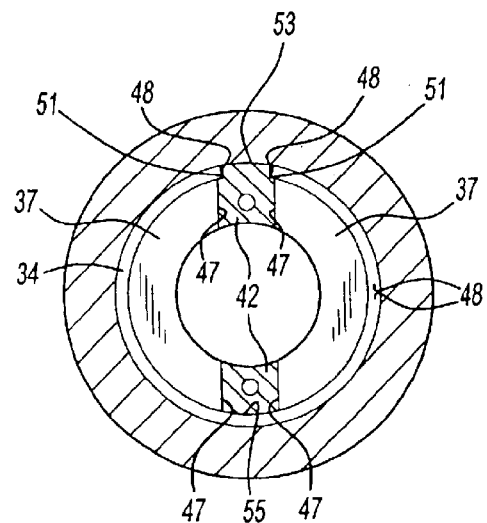
FIG. 3 is a cross-sectional view along line 3—3 as shown in FIG. 1.

As can be appreciated from FIG. 3, the support structures 42 on the locking plate 40 extend into and between the circumferential ends 47 of the holding member 37. Thus, when assembled, the support structures 42 abut ends 47 of the holding members 37 such that between the two support structures 42 and the two holding members 37, there is complete circumferential support for the locking ring 34.

Now, when assembling the valve of FIG. 1A utilizing the inventive C-ring support structure, one initially places the porting sleeve 23 within the housing 21. The piston 22 is then inserted. The closure plate 30 is then inserted. The C-ring 34 is then moved into groove 36. One of the holding members 37 is then moved into the interior of the C-ring 34, and then moved radially outwardly to engage the C-ring in groove portion 38. The other holding member 37 may then be mounted in a similar fashion.

Locking plate 40 is then moved into the housing 21 with the support surfaces positioned between the end surfaces 47. Pins or bolts 43 are then inserted through the openings 44 and into openings 46 in the plate closure, locking the elements together. In this fashion, porting sleeve 23 need not move axially, but a C-ring can still be utilized. This "zero clearance" assembly thus benefits from the use of a C-ring to hold the locking sleeve 23 relative to the housing 21.

Of course, many other applications, including applications beyond valves, will benefit from this assembly.

Although a preferred embodiment of this invention has been disclosed, a worker of ordinary skill in the art would recognize that certain modifications would come within the scope of this invention. For that reason, the following claims should be studied to determine the true scope and content of this invention.

What is claimed is:

1. A spool valve comprising:

a housing defining an inner bore;

a porting sleeve positioned at a fixed axial position within said inner bore;

a piston movable within said porting sleeve;

a C-ring holding said porting sleeve at said axial position relative to said housing, said C-ring being received in a groove in said inner bore of said housing, said C-ring further being received in a groove in at least two separate circumferentially spaced holding members together defining a support for a radially inner portion of said C-ring.

2. A spool valve as recited in claim 1, wherein a closure plate is positioned between said porting sleeve and said support structure.

3. A spool valve as set forth in claim 1, wherein said holding members are part-circular members, each having a groove portion at a radially outer peripheral surface for receiving said C-ring.

4. A spool valve as set forth in claim 3, wherein a locking plate includes support structure positioned circumferentially between circumferential ends of said holding members, to provide effective full circumferential support for said radially inner portion of said C-ring.

5. A spool valve as set forth in claim 4, wherein said locking plate is fixed axially outwardly of said holding members along an axis extending through said bore.

6. A spool valve as set forth in claim 5, wherein a closure plate is positioned between an axially outer end of said porting sleeve and said holding members, said locking plate being fixed to said closure plate.

7. An assembly including a C-ring securing two parts comprising:

a first part defining a bore;

a second part received within said bore; and a C-ring received in a groove in one of said first and second parts, said C-ring being provided with at least two separate, distinct holding members preventing axial movement of said first part relative to said second part along an axis of said bore, including a part groove for supporting said C-ring.

8. An assembly as recited in claim 7, wherein said one of said first and second parts is said first part.

9. An assembly as recited in claim 7, wherein said holding members are part-circular members, each having a groove portion for receiving said C-ring.

10. An assembly as recited in claim 9, wherein a locking plate includes support structure positioned circumferentially between circumferential ends of said holding members to provide effective full circumferential support for said C-ring.

11. An assembly as recited in claim 10, wherein said locking plate is fixed axially outwardly of said holding members along an axis extending through said bore.

12. An assembly as recited in claim 11, wherein a closure plate is positioned between an axially outer end of the other of said first and second parts and said support structure, said locking plate being fixed to said closure plate.

13. A method of assembling a C-ring comprising the steps of:

(1) providing a first part having a bore, and a second part;

(2) inserting said second part within said bore;

(3) inserting a C-ring within a groove in said bore of said first part; and (4) inserting a first part circular member extending for less than 180° within said C-ring, and moving said first part-circular member to engage said C-ring, and then moving at least a second part circular member within said C-ring and moving said second part-circular member to engage said C-ring, said first and second part-circular members providing support for said C-ring, such that said C-ring prevents movement of said second part axially outway of said bore.

* * * * *

UNITED STATES PATENT AND TRADEMARK OFFICE
CERTIFICATE OF CORRECTION

PATENT NO.     : 6,814,098 B1
DATED          : November 9, 2004
INVENTOR(S)    : Marocchini It is certified that error appears in the above-identified patent and that said Letters Patent is hereby corrected as shown below:

Column 4,
Line 38, "outway" should read as -- outwardly --.

Signed and Sealed this

Twenty-second Day of March, 2005

JON W. DUDAS
*Director of the United States Patent and Trademark Office*